Jan. 22, 1924.
G. C. MONCKMEIER
1,481,382
PISTON RING EXTRACTOR
Filed Sept. 7, 1920
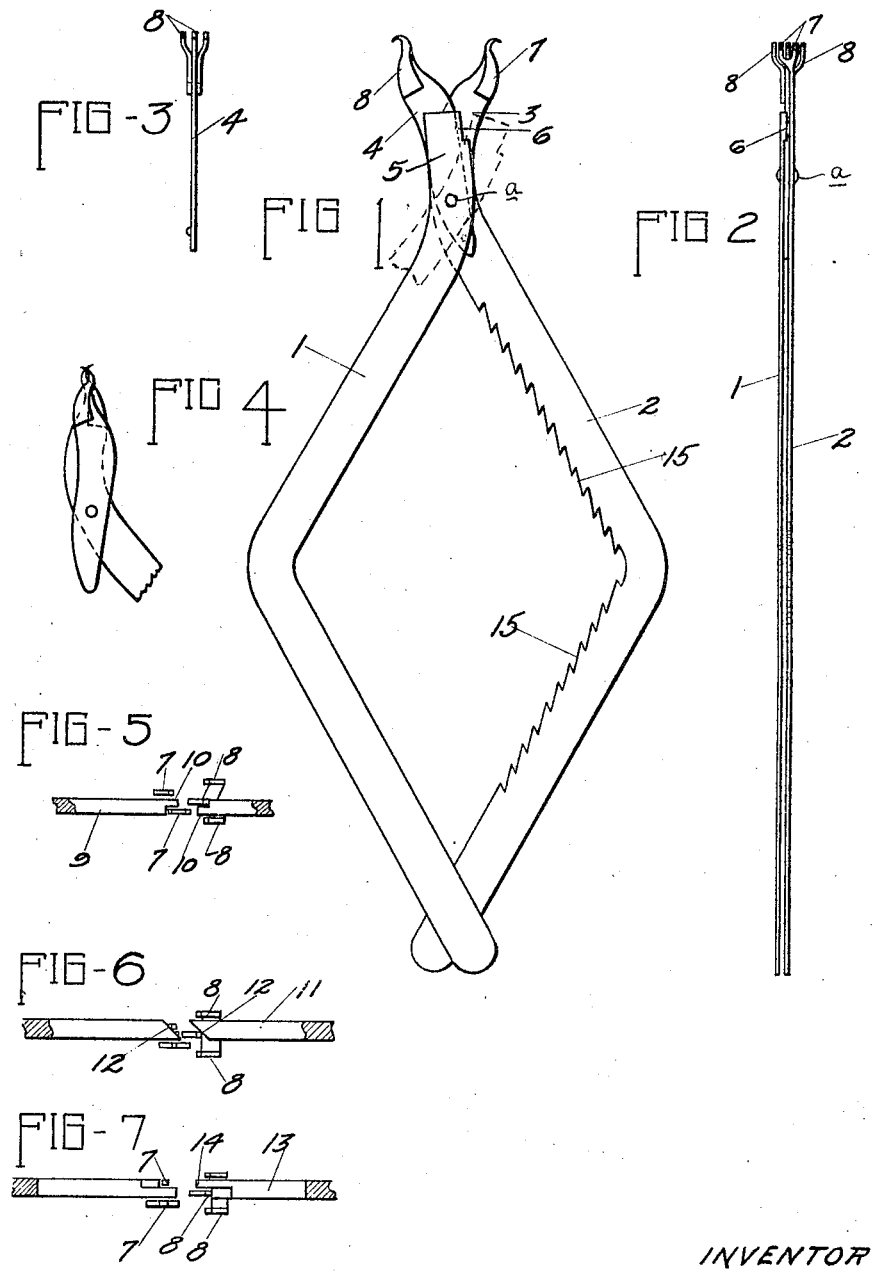
INVENTOR
Gustav C. Monckmeier.
BY Walter N. Haskell.
his ATTORNEY Patented Jan. 22, 1924.

1,481,382

UNITED STATES PATENT OFFICE.

GUSTAV C. MONCKMEIER, OF TIPTON, IOWA.

PISTON-RING EXTRACTOR.

Application filed September 7, 1920. Serial No. 408,421.

*To all whom it may concern:*

Be it known that I, GUSTAV C. MONCK-MEIER, a citizen of the Republic of Germany, residing at Tipton, in the county of Cedar and State of Iowa, have invented certain new and useful Improvements in a Piston-Ring Extractor, of which the following is a specification.

My invention pertains to tools for extracting piston rings. It is more specially designed for use with internal combustion engine pistons, and its prime purpose is to assist in the removal of the rings when they have become worn, or when the piston has become so foul that it is desired to clean same. On account of the spring tension which such rings possess, it is a difficult matter to remove same, especially when the same have been in use for some time, and are encrusted with carbon.

The piston rings are provided with a joint at one side, so as to allow for expansion, and also to permit the same to be readily placed in position on the piston, or removed therefrom. For this purpose the ring is spread until the diameter thereof is greater than that of the piston, whereupon it can be slipped from one end thereof. At the place where the ring is broken it is provided with interposed projections which overlap or dove-tail into each other under compression, and these projections are of various forms, sometimes having the character of right and left parts, so that a tool which will operate on one form is not suitable for another. A separate tool for each different form of ring joint is therefore required. My invention is so constructed and arranged that it is possible to use the same with different forms of rings.

The construction, arrangement, and operation of the parts of the device will more fully appear from the following specification, reference being had to the drawings accompanying the same, in which:

Fig. 1 shows the invention in side elevation.

Fig. 2 is an edge view thereof.

Fig. 3 is a detail of the arm 4.

Fig. 4 is a detail of the arms 3 and 4, with the teeth thereon interjoined.

Figs. 5, 6, and 7 show segments of three forms of rings, from the inside thereof, with the teeth 7 and 8 diagrammatically shown in various connections therewith.

The invention comprises a pair of handles 1 and 2, pivotally united, as at $a$, the handle 2 being projected into an arm 3, and a similar arm 4 being pivoted in common with the handles 1 and 2. The handle 1 has a projection 5, provided with an inwardly turned lug 6, which engages the edge of the arm 4, and forces such arm outwardly when the handles are moved toward each other.

On the end of the arm 3 are a pair of teeth 7, spaced apart from each other, and the arm 4 is fitted with three teeth 8, alternating with the teeth 7 when such teeth are brought together. The ends of all of such teeth are preferably hooked, as shown, the prongs of the teeth 7 being oppositely disposed to those of the teeth 8.

In Fig. 5 is shown part of a ring 9, provided at its ends with projections 10, which are shown as being engaged at one side of the joint by the teeth 7 and at the opposite side thereof by the middle tooth 8 and one of the side teeth thereof. Fig. 6 shows a ring having a joint with diagonal ends 12, one of which is engaged by the teeth 7 and the other end by the middle tooth 8, and the other outside tooth 8. Fig. 7 shows a ring 13 having projections 14 which are engaged by the same teeth as in Fig. 6, the projections 14 being arranged oppositely to those on the ring 9. The teeth 7 and 8 are therefore adapted for use with any style of ring, the teeth 8 being out of alignment with the teeth 7 in each direction diagonally therefrom. If the lower tooth 8 were to be removed only the central tooth 8 would engage the end of the ring 10, and this would not be practical on account of the danger of its slipping out of place. In the same way the upper tooth 8 is essential in engaging the ends of the ring 13.

In removing the ring the arms 3 and 4 are brought together until the teeth thereon are interjoined, as shown in Fig. 4, whereupon the hooked portions of the teeth are inserted between the ends of the ring, and the arms 3 and 4 separated. This expands the ring until it is possible to slip it from the end of the piston. The hooks on the teeth engage the ends of the ring, and prevent the teeth from slipping therefrom, while in operation. The hooked portions of the teeth are brought to a fine edge, so that they will not project beyond the inner face of the ring, in which case they would crowd against the inner face of the piston groove, and interfere with the removal of the ring.

The invention is preferably formed of sheet metal, of suitable thickness and strength, and it can thereby be easily and cheaply produced.

It is obvious that if the device were to be used as an extracting tool only, the arm 4 could be made an integral part of the handle 1.

What I claim and desire to secure by Letters Patent, is:

1. A device of the class described, comprising a pair of handles, pivotally united; oppositely disposed arms projected therefrom; a pair of teeth on one of said arms spaced apart from each other and adapted to engage the end of a piston ring; and three similar teeth on the other of said arms, alternating in position with said first-named teeth; the movement of said handles away from each other operating to separate said arms and teeth.

2. In a device of the class described, a pair of arms pivotally united, so as to work in opposition to each other; a gripping member on the end of one of said arms adapted to engage the projecting end of a piston ring; a pair of gripping members on the end of the other arm in staggered relation with said first-named member, and capable of being overlapped therewith, for insertion in the joint of a piston ring; and means for separating or closing said arms, as desired.

In testimony whereof I affix my signature.

GUSTAV C. MONCKMEIER.